(12) United States Patent
Guo et al.

(10) Patent No.: US 10,527,759 B2
(45) Date of Patent: Jan. 7, 2020

(54) ANTI-GLARE PANELS

(71) Applicants: Toyota Motor Engineering & Manufacturing North America, Inc., Erlanger, KY (US); The Regents of the University of Michigan, Ann Arbor, MI (US)

(72) Inventors: Lingjie Jay Guo, Ann Arbor, MI (US); Debasish Banerjee, Ann Arbor, MI (US); Chengang Ji, Ann Arbor, MI (US)

(73) Assignees: TOYOTA MOTOR ENGINEERING & MANUFACTURING NORTH AMERICA, INC., Plano, TX (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 744 days.

(21) Appl. No.: 15/131,837

(22) Filed: Apr. 18, 2016

(65) Prior Publication Data
US 2017/0299774 A1    Oct. 19, 2017

(51) Int. Cl.
*G02B 1/11*    (2015.01)
*G02B 3/00*    (2006.01)

(52) U.S. Cl.
CPC .............. *G02B 1/11* (2013.01); *G02B 3/005* (2013.01)

(58) Field of Classification Search
CPC .... G02B 3/005; G02B 3/0056; G02B 3/0068; G02B 3/0006; G02B 3/0037
USPC ....... 359/443, 454, 455, 459, 601–614, 618, 359/619
See application file for complete search history.

(56) References Cited

U.S. PATENT DOCUMENTS

| | | | |
|---|---|---|---|
| 6,299,231 B1 | 10/2001 | Reitz | |
| 8,467,129 B2 | 6/2013 | Munro | |
| 8,827,473 B2 | 9/2014 | Brandt et al. | |
| 2007/0065638 A1* | 3/2007 | Wang | G02B 1/105 428/141 |
| 2008/0278811 A1* | 11/2008 | Perkins | G02B 5/3058 359/485.05 |

(Continued)

FOREIGN PATENT DOCUMENTS

| | | |
|---|---|---|
| JP | 5634678 B2 | 12/2014 |
| JP | 2006-056413 A | 3/2016 |

OTHER PUBLICATIONS

Schumann et. al. ("Daytime veiling glare and driver visual performance" Influence of windshield rake angle and Dashboard reflectance, Journal of Safety Research, vol. 28, No. 3, pp. 133-146, 1997).*

(Continued)

*Primary Examiner* — Robert E. Tallman
(74) *Attorney, Agent, or Firm* — Dinsmore & Shohl LLP

(57) ABSTRACT

An anti-glare panel includes a panel with a length and a plurality of alternating black color and non-black color strips extending along the length of the panel. A plurality of lenticular lenses extend along the length of the panel and over the plurality of alternating black color strips and non-black color strips. A single lenticular lens array extends over a pair of a black color strip and a non-black color strip. The plurality of lenticular lenses reflect light from the black color strips within a veiling glare range and reflect light from the non-black color strips outside of the veiling glare range.

20 Claims, 13 Drawing Sheets

(56) References Cited

U.S. PATENT DOCUMENTS

| | | | |
|---|---|---|---|
| 2009/0097125 A1* | 4/2009 | Munro | B60R 13/02 359/614 |
| 2010/0238548 A1* | 9/2010 | Watanabe | G02B 1/04 359/488.01 |
| 2011/0128470 A1 | 6/2011 | Yorita et al. | |
| 2015/0219913 A1 | 8/2015 | Lee et al. | |

OTHER PUBLICATIONS

Lee et. al. "Optically bifacial thin-film wire-grid polarizes with nano-patterns of a graded metal-dielectric composite layer", Optical Express, 16, 16867-16876 (Year: 2008).*

* cited by examiner

ANTI-GLARE PANELS

TECHNICAL FIELD

The present specification generally relates to anti-glare panels and, more specifically, to vehicle anti-glare dashboards that are not black in color and have reduced or no veiling glare.

BACKGROUND

Colored interiors, i.e. non-black colored interiors, which are appealing to consumers, are present in a considerable percentage of manufactured, marketed and sold automobiles, trucks, etc. Different materials, such as fabric, leather and vinyl, are commonly used for the colored interiors. However, developing dashboards of different colors such as red, green, blue, etc., has been hampered due to a "veiling glare." Regarding vehicle dashboards, veiling glare is the projection of light reflected from the dashboard to the windshield, and further reflection by the windshield into the eyes of an occupant in the vehicle, e.g. the driver. Veiling glare appears as projected images on the windshield within the occupant's visual field and can annoy the occupant and be undesirable. Accordingly, a need exists for alternative vehicle dashboards that have other non-black colors and yet avoid veiling glare.

SUMMARY

In one embodiment, an anti-glare panel includes a panel with a length and a width, and a plurality of alternating black and non-black strips extending along the length of the panel. A plurality of lenticular lenses extends along the length of the panel over the plurality of alternating black and non-black strips. The plurality of lenticular lenses reflect light from the black strips within a veiling glare range and reflect light from the non-black strips outside of the veiling glare range. The panel can be a dashboard in a vehicle with a non-black color appearance to the human eye viewing the panel (non-black dashboard). The non-black dashboard extends from a vehicle windshield at an acute angle (rake angle) and when an occupant in the vehicle is looking through the windshield, reflection of light from the non-black strips in the second direction prevents the projection of the non-black dashboard onto the windshield within the individual visual field.

According to another embodiment, an anti-glare panel includes a panel with a length and a width and a plurality of alternating black and non-black strips extending along the length of the panel. The width of a pair of black and non-black strips is less than 100 microns. A plurality of lenticular lenses extends along the length of the panel and over the plurality of alternating black and non-black strips. The plurality of lenticular lenses reflect light from the black strips within a veiling glare range and reflect light from the non-black strips outside a veiling glare range. The veiling glare range is between than 35 degrees and 85 degrees relative to a surface of the panel. The plurality of lenticular lenses has a first index of refraction $n_1$ and an anti-reflection top coat is included and extends over the plurality of lenticular lenses. The anti-reflection top coat has a second index of refraction $n_2$ that is greater than the index of refraction for air and less than the first index of refraction $n_1$.

According to another embodiment, an anti-glare dashboard includes a dashboard with a length and a width, the dashboard having a rake angle θ relative to a glass pane. A plurality of alternating black and non-black strips extend along the length of the dashboard and a plurality of lenticular lenses extend along the length of the dashboard and over the plurality of alternating black and non-black strips. Each of the lenticular lenses has an arcuate top portion with a radius R and a thickness d. In embodiments, the radius R is less than 50 microns, preferably less than 40 microns, and more preferably less than 30 microns, and the thickness d is less than 100 microns, preferably less than 90 microns, and more preferably less than 80 microns. The plurality of lenticular lenses reflect light from the black strips within a veiling glare range between 2θ−30° and 2θ+30°, in some instances between 2θ−15° and 2θ+15°, and reflect light from the non-black strips outside the veiling glare range between 2θ−30° and 2θ+30°, in some instances 2θ−15° and 2θ+15°.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
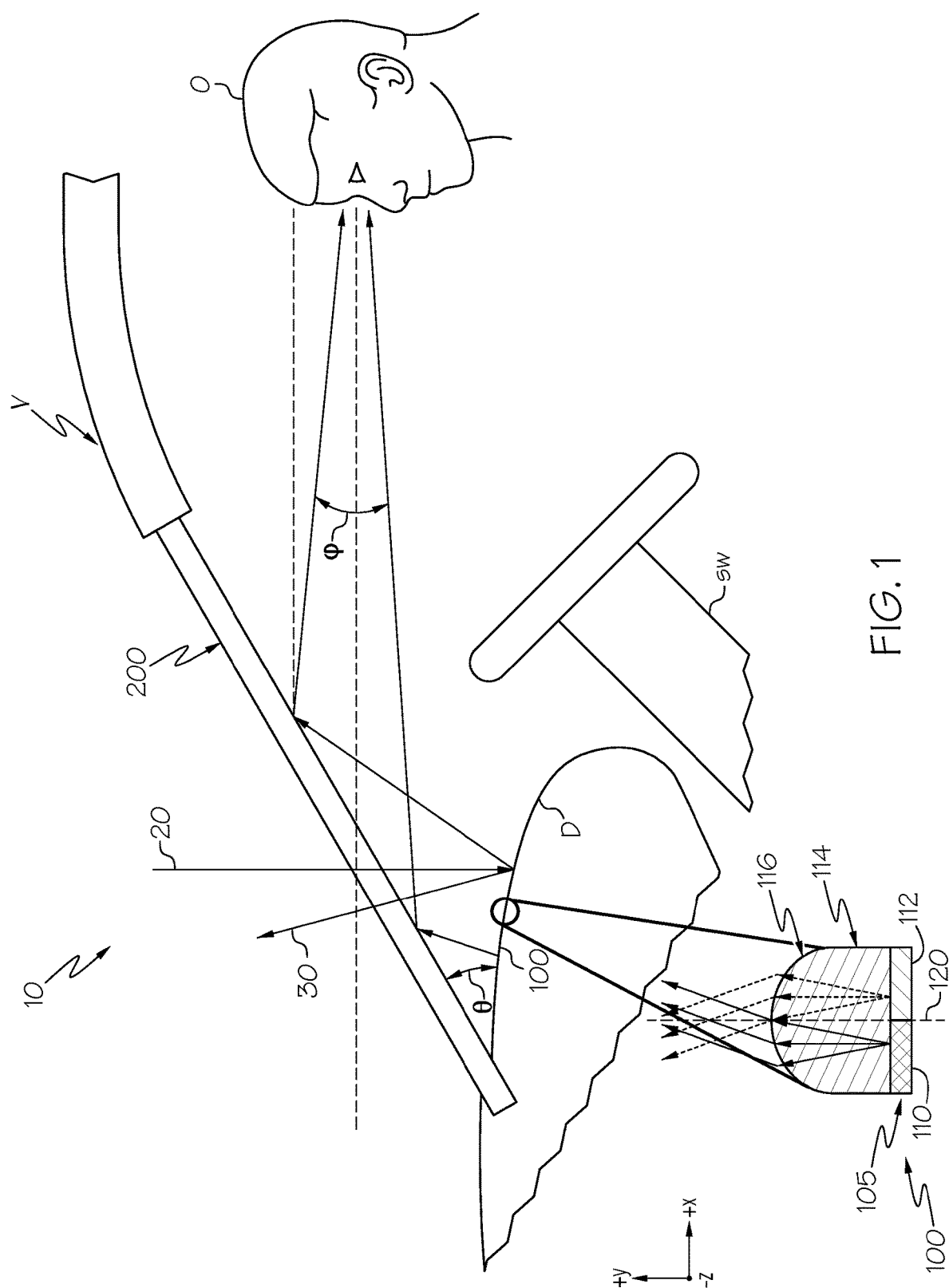
FIG. 1 schematically depicts an anti-glare panel according to one or more embodiments described and illustrated herein.

FIG. 1 generally depicts one embodiment of an anti-glare panel with a non-black color appearance. Referring to the coordinate system in the figure, the anti-glare panel has a length in the +Z direction and a width in the +X direction. A plurality of alternating black color (black) strips and non-black color (non-black) strips (only one shown) extend parallel to each other and along the length of the panel. A plurality of lenticular lenses extends parallel to each other and along the length of the panel. The plurality of lenticular lenses extends over the plurality of alternating black and non-black strips. It should be appreciated that the term "over" refers to the lenticular lens extending across and covering the plurality of alternating black strips and non-black strips, and depending on the orientation of the anti-glare panel, the plurality of lenticular lenses can be located above, below, to the right or to the left of the plurality of alternating black strips and non-black strips. Each lenticular lens is associated with and generally covers a single pair of a black strip and a non-black strip. Light is reflected from the black strips within a veiling glare angular range (φ) for an occupant (O) that is looking through a glass pane that is adjacent to and oriented at a rake angle (θ) relative to the anti-glare panel. Light is reflected from the non-black strips outside of the veiling glare range φ for the occupant looking through the glass plane. The anti-glare panel appears as the non-black color to the occupant O, but does not exhibit non-black color glare to the individual looking through the glass pane, i.e. to the human eye, the anti-glare panel has the appearance of the non-black color. The anti-glare panel can be a dashboard in vehicle V and the glass pane can be a windshield of the vehicle having the rake angle θ relative to the dashboard. The term "black" and "black color" are defined as dark colors, which minimizes the light reflection from these regions and absorbs at least 95% of incident white light.

Not being bound by theory, veiling glare angular range and one or more designs for anti-glare panels are disclosed below.

Figure 2A:
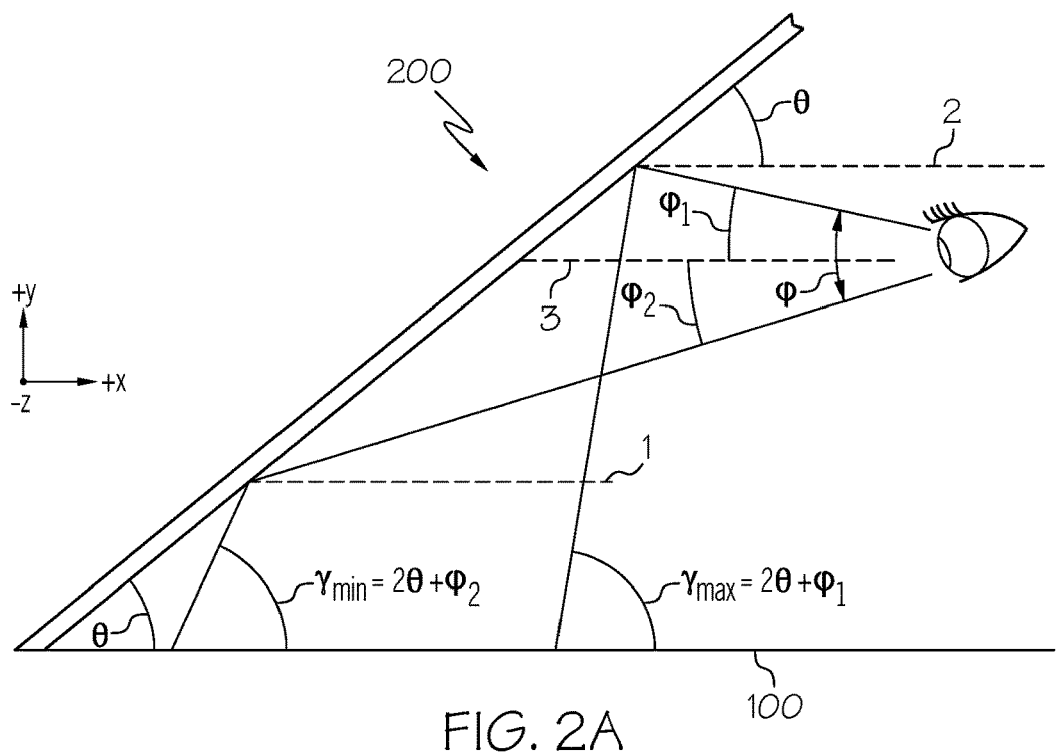
FIG. 2A schematically depicts a panel oriented at a rake angle (θ) from a glass pane illustrating a relation between reflection angles from the panel (γ) and the rake angle θ.

Referring now to FIGS. 1-2, embodiments 10 depict an anti-glare panel 100 oriented at a rake angle θ relative to a glass pane 200. The rake angle θ affects the veiling glare as reflectivity increases with incident angles of lights according to the Fresnel equations plotted in FIG. 3. Ambient light 20 is unpolarized with superposition of p- and s-polarization components. For a veiling glare angular range analysis, and based on a review of rake angles for commercial vehicles, the rake angle θ is assumed to have a range from 25° to 35°. Light reflected from the glass pane 200 contributing to veiling glare can have an angular range φ (veiling glare range φ) between the horizontal dashed lines 1 and 2 in FIG. 2A. The anti-glare panel reflects light 30 outside of the veiling glare range φ. The veiling glare range φ is divided into an angular range of $\varphi_1$ for light reaching an occupant's eyes from above the horizontal line 3 and an angular range of $\varphi_2$ for light reaching the occupants eyes from below the horizontal line 3. The angular range $\varphi_1$ is defined as positive and the angular range $\varphi_2$ is defined as negative. Based on a review of vehicles with different rake angles θ, the veiling glare range φ is assumed to vary from −15° to 15° but can vary from −30° to 30°. It should be appreciated that the veiling glare range φ is with respect for light reflected from the glass pane 200.

Figure 2B:
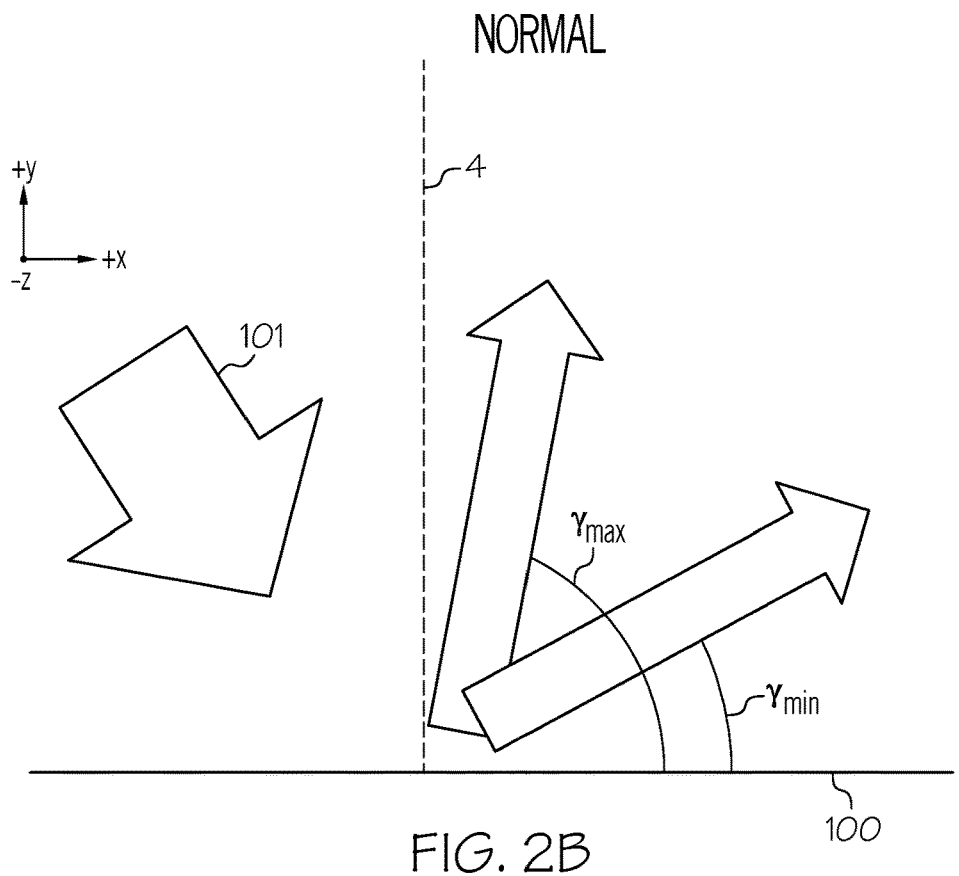
FIG. 2B schematically depicts veiling glare ranges for different rake angles.
Figure 3:
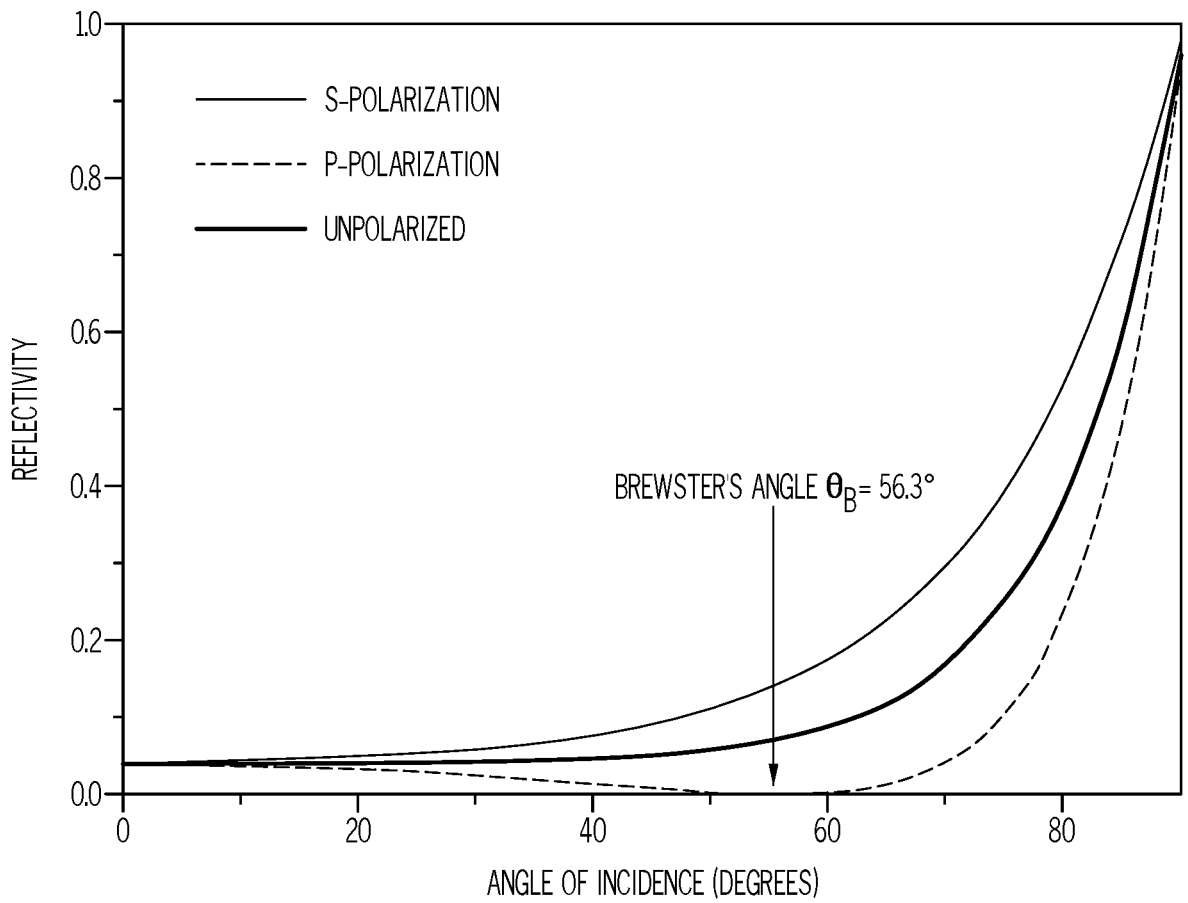
FIG. 3 graphically depicts the reflectance of light at a glass-air interface as a function of incidence angle.

Regarding light reflected from the anti-glare panel 100, a veiling glare angular range γ (veiling glare range γ) is defined as the angular range within which light reflected from the anti-glare panel 100 will be reflected by the glass pane 200 within the veiling glare range φThe mathematical relationship:

$$\gamma = 2\theta + \varphi \qquad (1)$$

defines the veiling glare range γ in terms of the rake angle θ and the veiling glare range φ. Considering the defined range of both θ and φ noted above, the veiling glare range γ is ranges from $\gamma_{min}=2\theta-15°$ to $\gamma_{max}=2\theta+15°$ for vehicles with varied rake angles θ. FIG. 2B depicts the veiling glare range γ between $\gamma_{min}$ to $\gamma_{max}$. It should be appreciated that for incident light illustrated by arrow 101, the entire veiling glare range γ lies within the right half area with respect to a normal boundary 4 of the anti-glare panel 100. Such an observation provides basic design criteria for the anti-glare panel 100, i.e. veiling glare can be generally abated if light reflected from the anti-glare panel 100 is reflected at angles outside of the veiling glare range γ between $\gamma_{min}$ to $\gamma_{max}$.

Figure 4A:
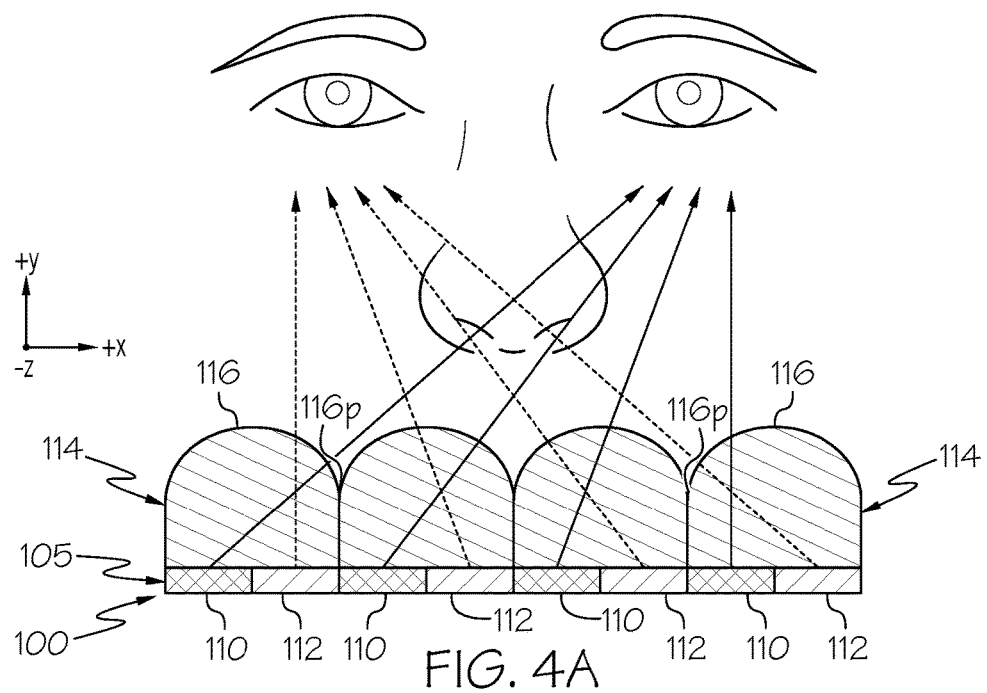
FIG. 4A schematically depicts the observance of different images when viewed from different angles and the varied visual effects created by lenticular lenses.
Figure 4B:
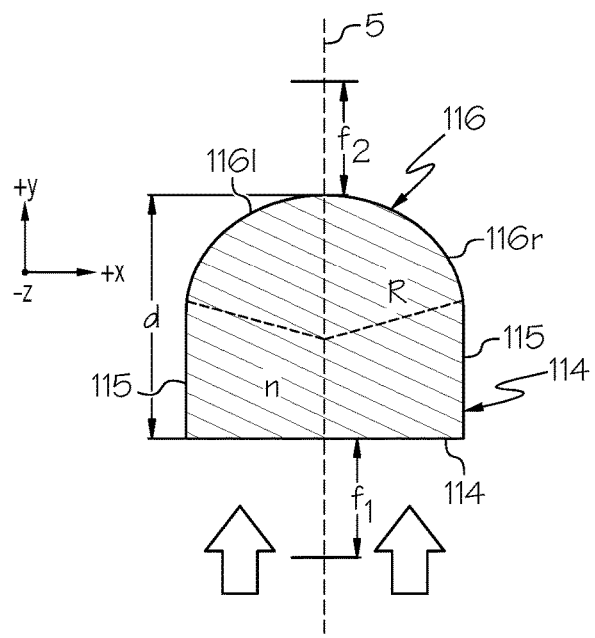
FIG. 4B schematically depicts a dimensional analysis of a single lenticular lens.
Figure 4C:
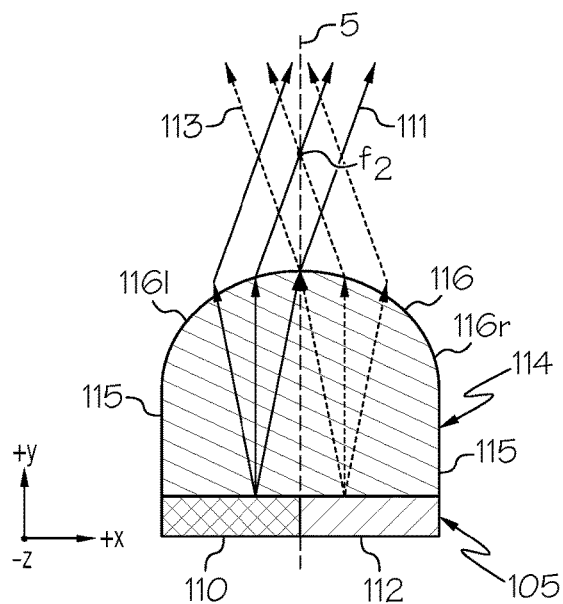
FIG. 4C schematically depicts the reflection of light for a bottom surface of a single lenticular lens.

Lenticular lenses can be defined as curved structures that are periodic in a first direction and infinite in length in a second direction that is orthogonal to the first direction. Referring now to FIGS. 4A-4C, a plurality of lenticular lenses 114, having a width and being periodic in the +X direction and having a length in the −Z direction, extend over a color layer 105. The color layer 105 has alternating black color strips 110 and non-black color strips 112 extending along the length and parallel to the plurality of lenticular lenses 114. Light from the plurality of alternating black strips 110 from is reflected to the right in the figure and light from the plurality of alternating non-black strips 112 is reflected to the left in the figure. Each lenticular lens 114 is made from a material with an index of reaction n, has a central axis 5 and pair of side walls 115 extending from and between a bottom surface 118 and a dome top 116. It should be appreciated that the plurality of lenticular lenses 114 can be made from a single layer of lenticular lens material (FIGS. 8-9) with no physical boundary between adjacent lenticular lenses 114. As such, the side wall 115 between adjacent lenticular lenses 114 with no physical boundary there between is defined as a plane extending normal from the bottom surface 118 shared by the adjacent lenticular lenses 114 and intersecting the point (or line) 116p where the two respective adjacent dome tops 116 intersect or come into contact with each other.

Figure 7A:
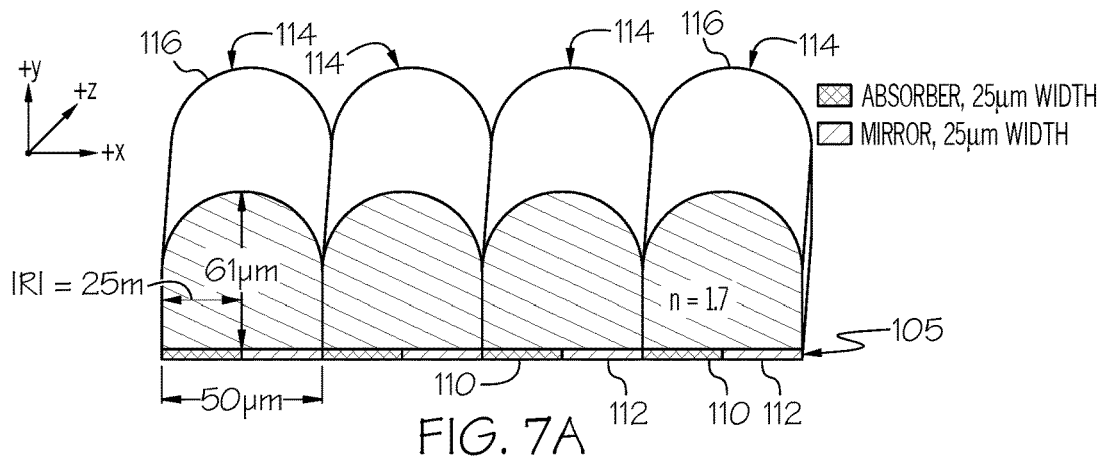
FIG. 7A schematically depicts a plurality of lenticular lenses having a thickness d of 61 microns and a radius |R| of 25 microns extending over a plurality of alternating black and non-black color strips.

The dome top 116 can be hemispherical with a radius R, or in the alternative, have an arcuate surface that is not hemispherical as discussed below with reference to FIGS. 7A-7C. The dome top 116 has a left side 116l that extends from the central axis 5 to the side wall 115 located on the left side of the central axis 5, and a right side 116r that extends from the central axis 5 to the side wall 115 located on the right side of the central axis 5. In embodiments, dome top left side 116l is associated with the black strip 110 and the dome top right side 116r is associated with the non-black strip 112. The term "associated with" is defined as a given dome top side 116l, 116r extending over and generally covering a given black, non-black color strip 110, 112. The term "generally" is defined as the given dome top side 116l, 116r extending over and covering at least 75% of a given black, non-black color strip 110, 112, and preferably the given dome top side 116l, 116r extending over and covering at least 85% of a given black, non-black color strip 110, 112.

The reflection of the black color into a different direction than a reflection of the non-black color can be explained with an ABCD transfer matrix method. The transfer function $\overrightarrow{M}$ of the single lenticular lens 114 depicted in FIGS. 4B and 4C is:

$$\overrightarrow{M} = \begin{pmatrix} 1 & 0 \\ -\frac{1-n}{R} & n \end{pmatrix} \begin{pmatrix} 1 & d \\ 0 & 1 \end{pmatrix} \begin{pmatrix} 1 & 0 \\ 0 & \frac{1}{n} \end{pmatrix} = \begin{pmatrix} 1 & \frac{d}{n} \\ -\frac{1-n}{R} & 1-d\frac{1-n}{nR} \end{pmatrix}, \quad (2)$$

where d is the thickness of the lens, n is the refractive index of the material which the lens is made from, R is the radius of a curved dome forming a top portion of the lens. The radius R is negative with respect to light coming from the bottom surface 118 of the lenticular lens 114. The three matrixes in the calculation of $\overrightarrow{M}$, from left to right, refer to the refraction across an interface between air and the bottom surface 118 interface, propagation within the lenticular lens 114, and refraction across an interface between the dome top 116 surface and air, respectively. From the expression in Eq. (2), the first and second focal point $f_1$ and $f_2$ can be further obtained as:

$$f_1 = \frac{R}{1-n} - \frac{d}{n}, f_2 = \frac{R}{1-n}. \quad (3)$$

For a typical lenticular lens illustrated in FIG. 4B, the first focal plane, which passes through $f_1$ and is perpendicular to a central axis 5 of the lenticular lens 114, is set exactly at the flat bottom plane of the lens, i.e. $f_1=0$. Based on this condition, the thickness d is related to the radius R and the refractive index n as:

$$d = \frac{nR}{1-n}. \quad (4)$$

Since the bottom surface 118 overlaps with the first focal plane, light coming from the bottom surface 118 at separate locations that are equidistance from the central axis 5 will be parallel to each other within the lenticular lens 114. However, the dome top 116, i.e. the dome top right side 116r, reflects light from a random point in the non-black strip 112 to the left of the central axis 5 and the dome top 166, i.e. the dome top left side 116l, reflects light from a random point in the black-strip 110 to the right of the central axis 5. It should be appreciated that such a control function of the lenticular lens 114 allows for the control of non-black light to be reflected outside of the veiling glare range γ depicted in FIG. 2B.

Figure 5:
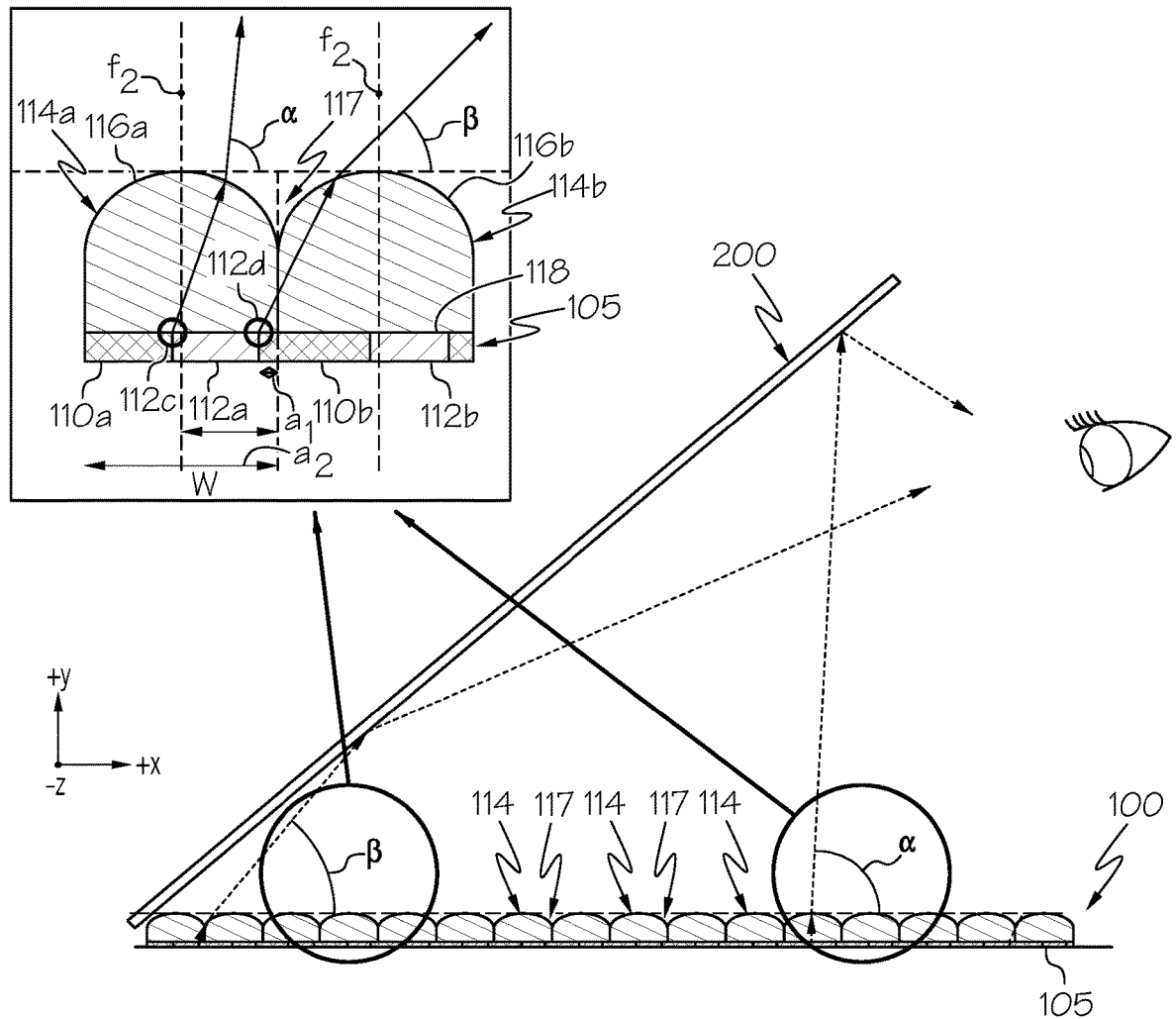
FIG. 5 schematically depicts an analysis of anti-reflection conditions for lenticular lenses using two extreme angular positions on a panel.

Referring now to FIG. 5, an anti-glare panel 100 with a plurality of lenticular lenses 114 resulting in light reflected from a non-black strip 112 into the right half plane is depicted. An analysis of extreme points, i.e. a left-most position 112b and a right-most position 112c of a non-black color strip 112, provides criteria to avoid light from non-black strips 112 being reflected within the veiling glare range γ. Specifically, anti-reflection conditions are defined as are $\alpha > \gamma_{max}$ and $\beta < \gamma_{min}$, where α is the minimal refracted angle by lenticular lens 114a for light coming from the left-most position 112b on a non-black color strip 112a and β is the maximal refracted angle by adjacent lenticular lens 114b for light coming from the right-most position 112c of the non-black strip 112a. The position and width of the non-black color strip 112a can be varied for design and optimization. In embodiments, each lenticular lens 114 is offset (shifted laterally, +X direction) from the pair of the black strip 110 and the non-black strip 112 that it covers as depicted in FIG. 5. An anti-reflection condition for the lenticular lens non-black color strip can be generalized as:

$$\alpha = \arctan\left(\frac{f_2}{a_2 - w/2}\right) \geq \gamma_{max}, \quad (5)$$

-continued $$\beta = \arctan\left(\frac{f_2}{a_1 + w/2}\right) \leq \gamma_{min}, \quad (6)$$

where $f_2$ is the second focal point, w is the period of the lenticular lens array, $\alpha_1$ is the distance from the right-most position 112c of the non-black strip 112a to the right side 114b of the lenticular lens 114a and $\alpha_2$ is the distance from the left-most position 112b to the right side 114b of the lenticular lens 114a. The distance $\alpha_2$ is greater than the distance $\alpha_1$ ($\alpha_2 > \alpha_1$). It should be appreciated that Eqns. 5 and 6 provide the condition non-black color light from adjacent lenticular lenses 114 to not be refracted into the right half plane depicted in FIG. 2B.

Still referring to FIG. 5, a valley 117 is present between adjacent lenticular lenses 114. Also, it can be desirable that an outer surface 119 of the anti-glare panel 100 appears smooth to the human eye, i.e. that the valleys 117 are not visibly noticeable to the human eye. According to the Rayleigh criterion sin θ=1.22λ/D, the smallest object size distinguished by the "naked eye" can be estimated determined from the expression L sin θ=1.22Lλ/D, where L is the viewing distance, λ is the light wavelength being used to view the object and D is the diameter of a human pupil. Assuming L=25 cm, λ=550 nm, and D≈3 mm, the smallest object size (L sin θ) is about 56 μm. As such, a plurality of lenticular lenses having a width of less than 56 μm would appear smooth to the human eye.

Figure 6A:
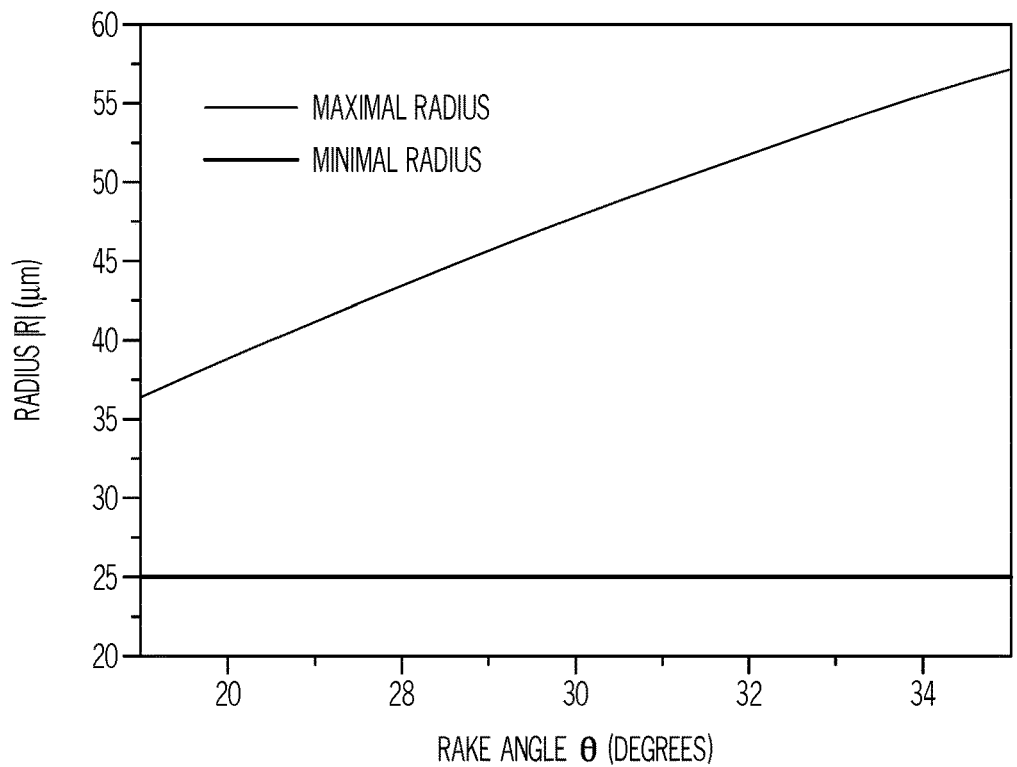
FIG. 6A graphically depicts design criteria for maximum and minimum radius |R| for a single lenticular lens as a function of rake angle θ.
Figure 6B:
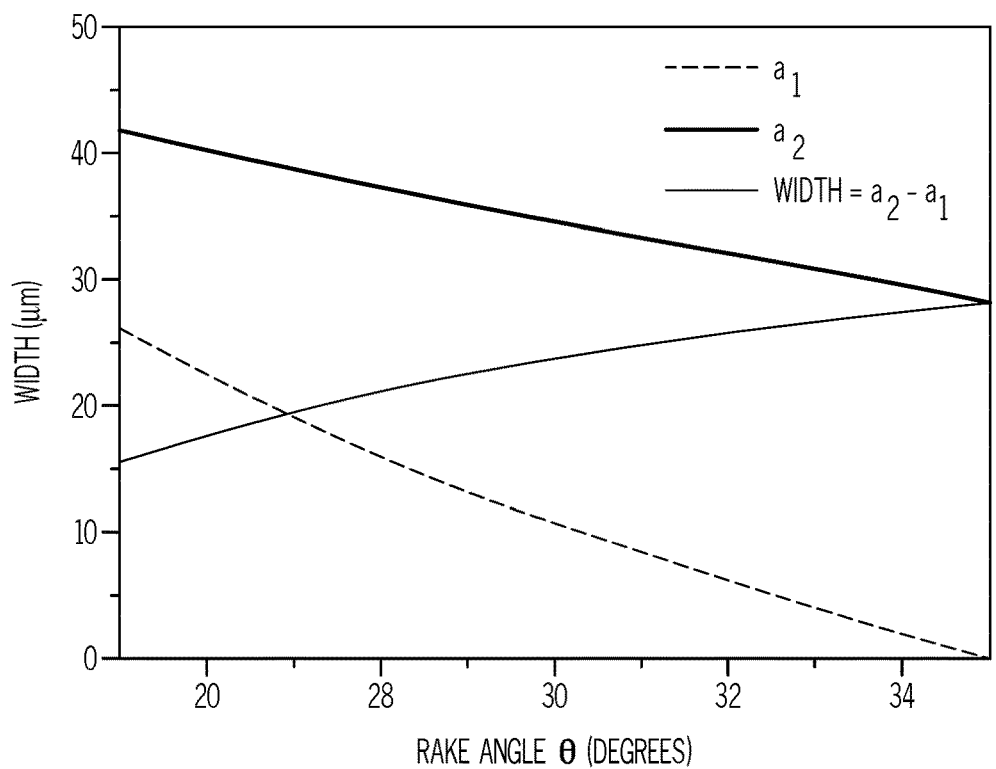
FIG. 6B graphically depicts design criteria for position and width of black and non-black stripes under a single lenticular lens as a function or rake angle θ.
Figure 6C:
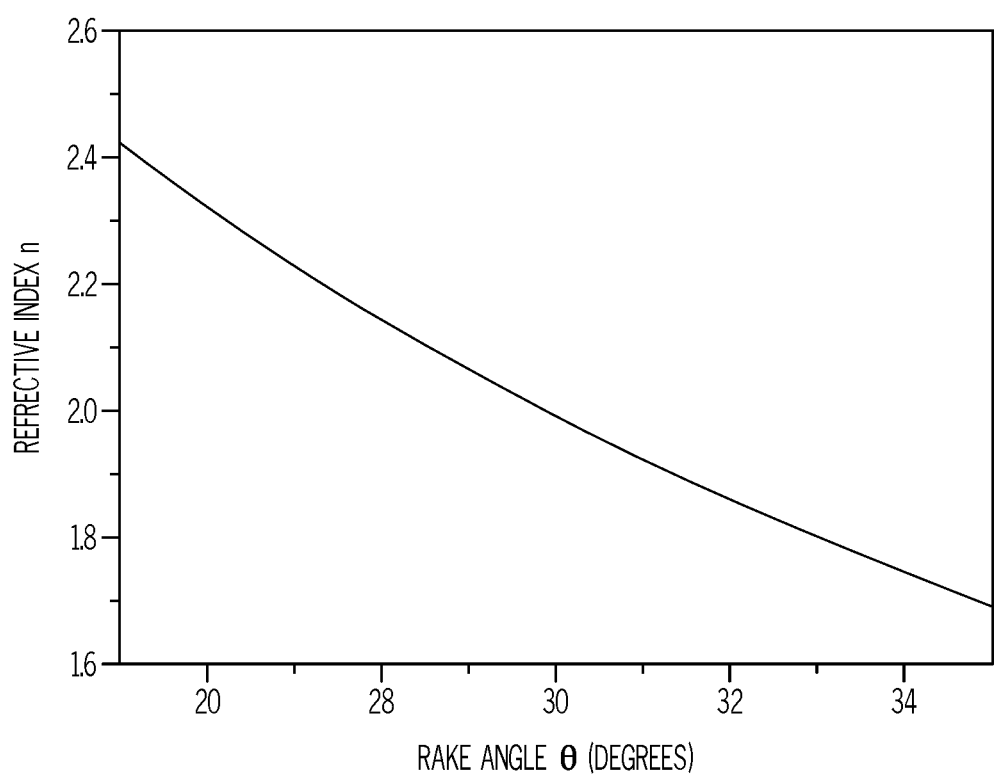
FIG. 6C graphically depicts design criteria for refractive index of the lenticular lens material as a function of rake angle θ.

To further optimize the lenticular lens design, $\alpha = \gamma_{max}$ and $\beta = \gamma_{min}$ is assumed and from Eqns. (5) and (6) the width of the non-black color strip can be expressed as:

$$a_2 - a_1 = w + \frac{|R|}{n-1}\left(\frac{1}{\tan(\gamma_{max})} - \frac{1}{\tan(\gamma_{min})}\right) \quad (7)$$

$$= 50 \text{ μm} + \frac{|R|}{0.7}\left(\frac{1}{\tan(\gamma_{min} + 30°)} - \frac{1}{\tan(\gamma_{min})}\right),$$

where $f_2=|R|/(n-1)$, w=50 μm, polyethylene terephthalate (PET) is assumed to be the lenticular lens material with a refractive index n=1.7, and $\gamma_{max}=\gamma_{min}+30°$ since γ=2θ+φ and φ varies from −15° to 15°. Based on Eq. (7), and given that and since $\alpha_2 > \alpha_1$ and $\gamma_{min}$ is dependent on θ, the upper limit of the radius R (maximal radius) can be calculated as a function of the rake angle θ as depicted in FIG. 6A. The minimal radius is set as 50 μm/2=25 μm. Considering that |R|≥w/2 according to the lens geometry, the largest width of a non-colored strip ($\alpha_2 - \alpha_1$) that provides the highest brightness is when |R|=w/2=25 μm according to Eqn. (7). Assuming the rake angle θ varies from 25° to 35°, the position and width of the non-black strip underneath a lenticular lens 114 can be determine with Eqns. (5)-(7) and is depicted in FIG. 6B for |R|=w/2=25 μm. It should be appreciated that when |R| varies within the range calculated and plotted in FIG. 6A, values of $\alpha_1$ and $\alpha_2$ can be obtained from Eqns. (6) and (7). It should also be appreciated that the lenticular lens material can be any transparent material and FIG. 6C illustrates the dependence of refractive index on rake angle assuming $\alpha_1=0$ and $\alpha_2=w/2=25$ μm. As such, the available variations of |R| and n provide freedom for anti-glare panel designs.

EXAMPLES

Figure 7B:
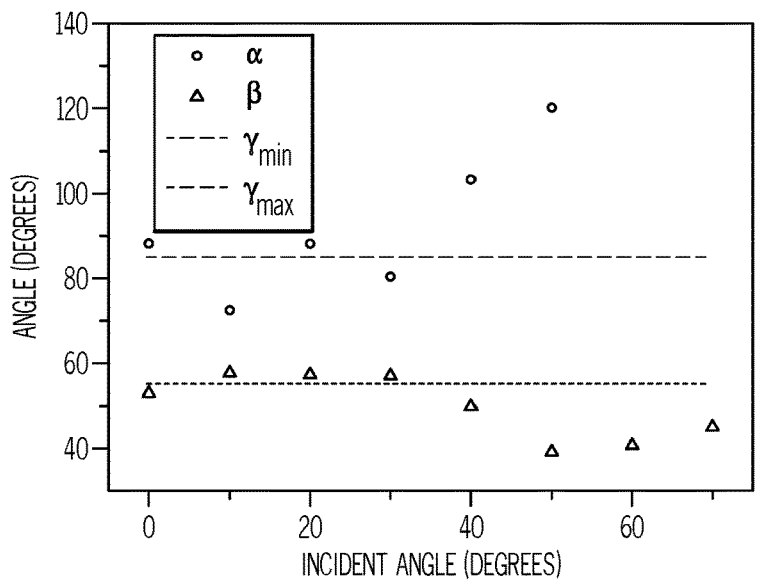
FIG. 7B graphically depicts the minimal refraction angle (α) by a single lenticular lens and the maximal refraction angle (β) by an adjacent lenticular lens as a function of light incident angle on the plurality of lenticular lenses depicted in FIG. 7A.
Figure 7C:
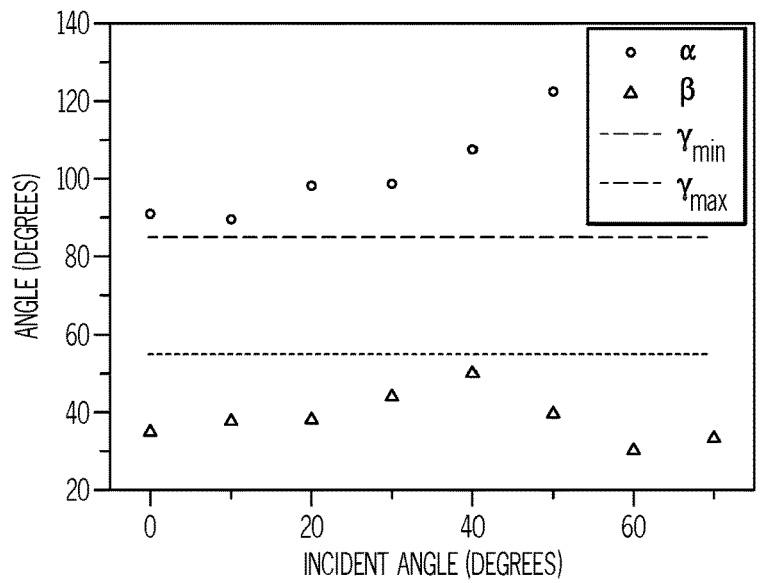
FIG. 7C graphically depicts the minimal refraction angle (α) by a single lenticular lens and the maximal refraction angle (β) by an adjacent lenticular lens as a function of light incident angle on an optimized plurality of lenticular lenses having a thickness d of 54 microns.

Referring to FIGS. 5 and 7, an anti-glare panel 100 design was developed with a radius |R| and period w set as |R|=w/2=25 μm for the non-black color strip 112. The refractive index n of the material for the lenticular lens 114 was assumed to be 1.7 and the height d of the lenticular lens 114 was calculated as d=61 μm per Eqn. 4. The position of the non-colored strip was fixed at $\alpha_1=0$ and $\alpha_2=25$ μm, which corresponded to the non-black color strip 112 having a width equal to a half period and satisfied the conditions of Eqns. (5)-(7). A rake angle θ of 35° was assumed, which corresponded to $\gamma_{min}=55°$ and $\gamma_{max}=85°$, respectively. A 'mirror' boundary condition, i.e. 100% of incident light was reflected from the non-black color strip 112 was assumed. Referring to FIG. 7B, the minimal refraction angle α by the single lenticular lens 114a and the maximal refracted angle β by the adjacent lenticular lens 114b were calculated and plotted as a function of incident angle. As shown in FIG. 7B, the minimal refraction angle α by a single lenticular lens 114a and the maximal refracted angle β by the adjacent lenticular lens 114b fell within the veiling glare range γ. Specifically, for incident angles between 10 and 30°, the minimal refraction angle α by the single lenticular lens 114a was less than $\gamma_{max}=85°$ and the maximal refracted angle β by the adjacent lenticular lens 114b was greater than $\gamma_{min}=55°$.

The anti-glare panel 100 was optimized by reducing the lenticular lens thickness d from 61 μm to 54 μm and assuming the same values for radius |R|, period w, $\alpha_1$, $\alpha_2$, θ, $\gamma_{min}$ and $\gamma_{max}$. Referring to FIG. 7C, the minimal refraction angle α by the single lenticular lens 114a and the maximal refracted angle β by the adjacent lenticular lens 114b were calculated and plotted as a function of incident angle. As shown in FIG. 7C, the minimal refraction angle α by a single lenticular lens 114a and the maximal refracted angle β by the adjacent lenticular lens 114b did not fall within the veiling glare range γ. Specifically, for incident angles between 0 and 70°, the minimal refraction angle α by the single lenticular lens 114a was greater than $\gamma_{max}=85°$ and the maximal refracted angle β by the adjacent lenticular lens 114b was less than $\gamma_{min}=55°$.

Figure 8A:
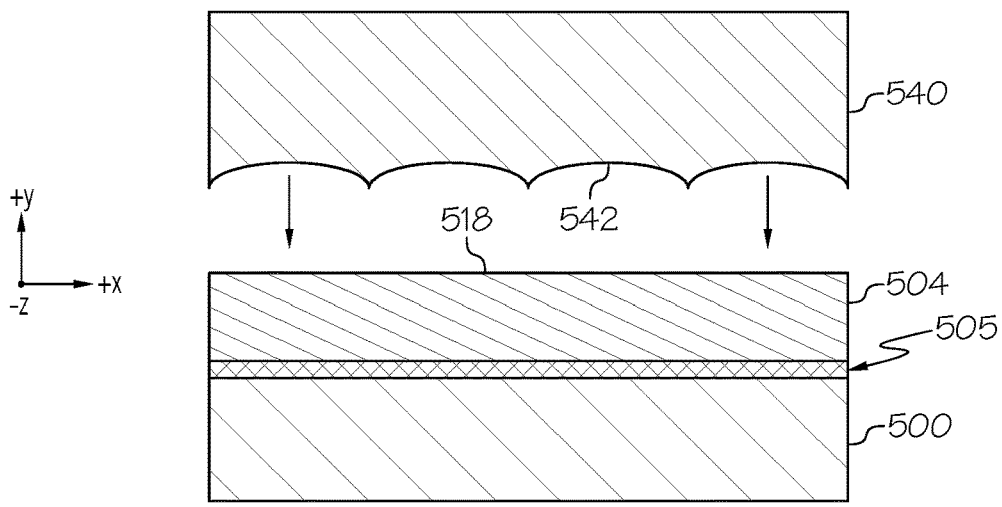
FIG. 8A schematically depicts a mold with a surface relief pattern being lowered onto a layer of lenticular lens array material extending over a black color polymer containing a non-black color UV-sensitive component.
Figure 8B:
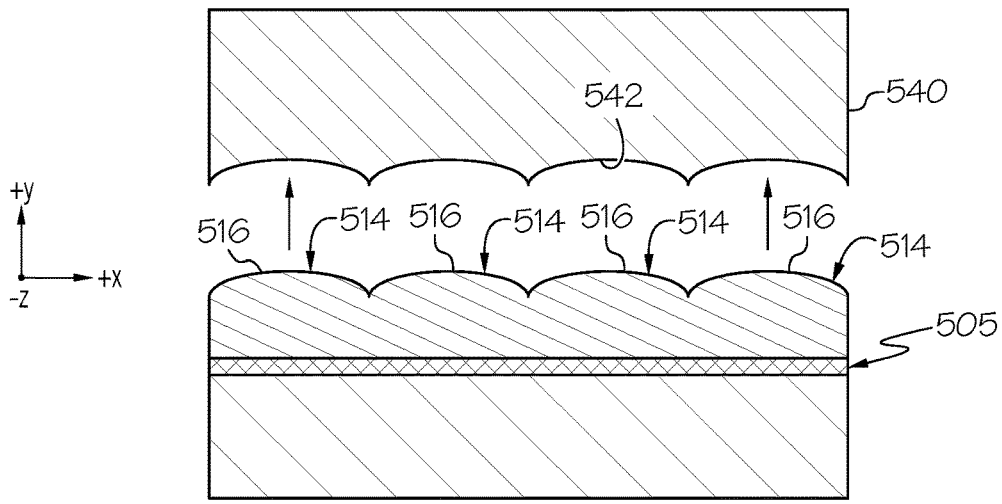
FIG. 8B schematically depicts the mold with the surface relief pattern depicted in FIG. 8A being raised from the layer of lenticular lens array material after a plurality of dome tops have been formed and a plurality of lenticular lenses have been produced.
Figure 8C:
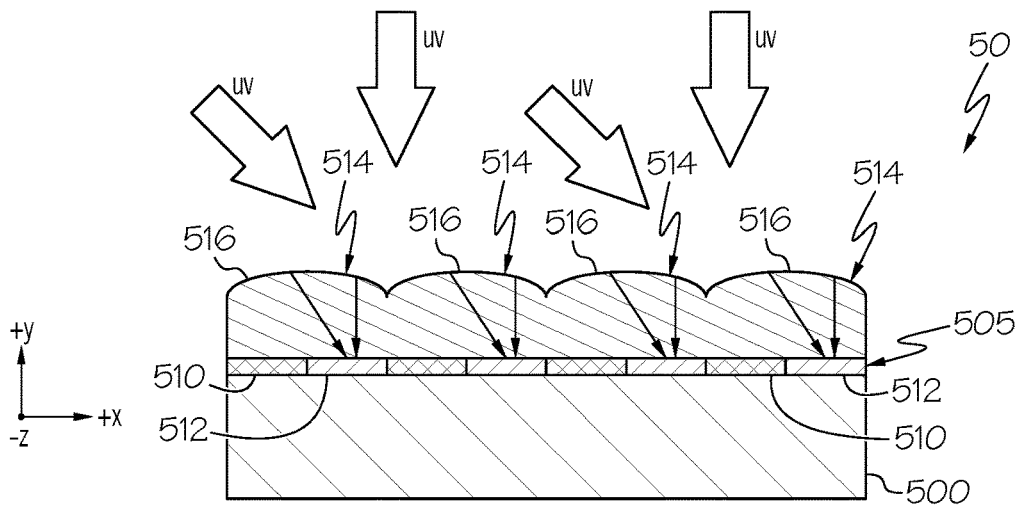
FIG. 8C schematically depicts exposure of the plurality of lenticular lenses depicted in FIG. 8B with UV light directed to left hand side portions of each of the plurality of lenticular lenses which is focused on the right hand portions of the black color polymer containing the non-black color UV-sensitive component.

Anti-glare panels disclosed herein can be fabricated using any known and yet unknown method, technique suitable for manufacture of panels such as dashboards, lenticular lens array panels, etc. In embodiments, FIGS. 8A-8C depict manufacture of an anti-glare panel 50. Referring specifically to FIG. 8A, a substrate 500 has a bottom layer 502 and a lenticular lens layer 504. The substrate 500 can be made from any substrate material suitable for a given anti-glare panel application including glass, cardboard, polyvinylchloride (PVC), PET, etc. The bottom layer 502 can be made from a polymer material, e.g. a polymer material having a combination of different color dyes (magenta, cyan, yellow, etc.) that when mixed together give the polymer material a black color. At least one of the color dyes is UV-sensitive. The lenticular lens layer 504 can be made of any material suitable for use as a lenticular lens including PET. Spaced apart from and the lenticular lens layer 504 is a mold 540, e.g. a mold made from a metallic material such as aluminum, copper, aluminum, iron, titanium or alloys thereof. The mold 540 has an inner surface 542 with a desired surface profile to produce a plurality of periodic top domes 516 into an outer surface 518 of the lenticular lens layer 504. As indicated by the downward pointing arrows in FIG. 8A, the inner surface 542 of the mold 540 is moved into contact with the lenticular lens layer 504. It should be appreciated a force in the same direction as the downward pointing arrows is applied to the mold 540 such that a plurality of periodic top domes 516 can be formed in the lenticular lens layer 504 as depicted in FIG. 8B. Referring specifically to FIG. 8B, the mold 540 has been removed from the lenticular lens layer 504, a plurality of periodic top domes 516 has been formed on the lenticular lens layer 504 and a plurality of lenticular lenses 514 extending in a length direction along the −Z axis has been produced. It should be appreciated that the plurality of lenticular lenses 514 can have a desired radius R, period w and thickness d as discussed above with reference to FIGS. 4B, 5, and 7A. Referring specifically to FIG. 8C, UV-light is directed to the right side of each lenticular lens 514 and the at least one UV-sensitive color dye changes color to provide a non-black color strip 512 next to a black color strip 510.

Figure 9A:
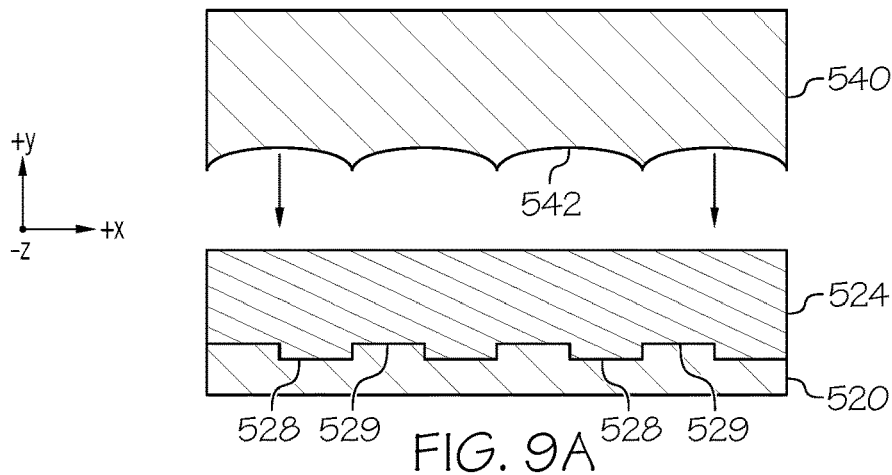
FIG. 9A schematically depicts a top mold with a surface relief pattern being lowered onto a layer of lenticular lens array material with a bottom surface having periodic step portions extending over a bottom mold with complimentary periodic step portions.
Figure 9B:
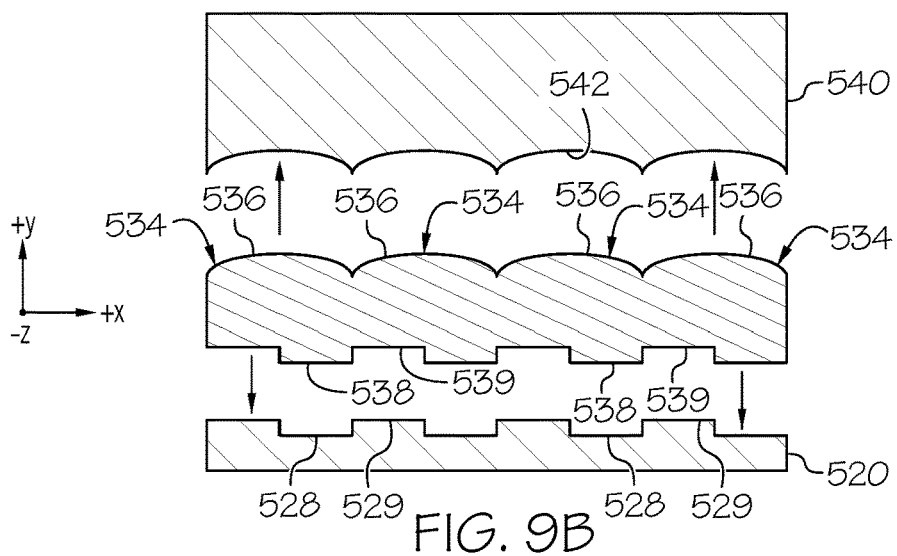
FIG. 9B schematically depicts the top mold with the surface relief pattern depicted in FIG. 9A being raised from the layer of lenticular lens array material after a plurality of dome tops have been formed and the layer of lenticular lens array material with the plurality of dome tops and the bottom surface with the periodic step portions being raised from the bottom mold.
Figure 9C:
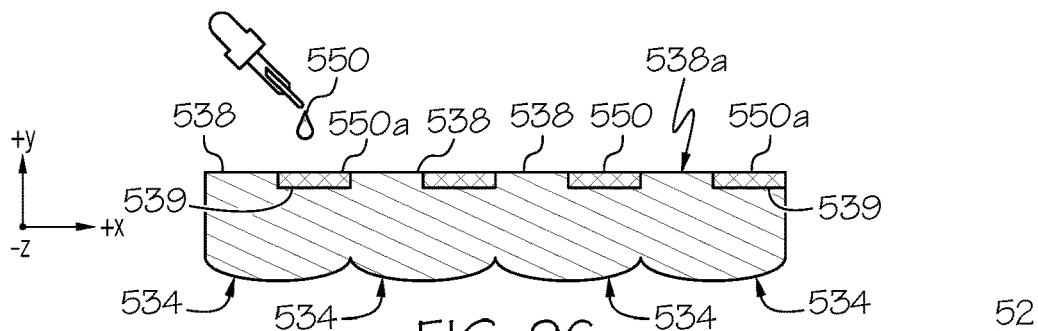
FIG. 9C schematically depicts black color ink being injected into lower step portions on the bottom surface of the layer of lenticular lens array material with the plurality of dome tops.
Figure 9D:
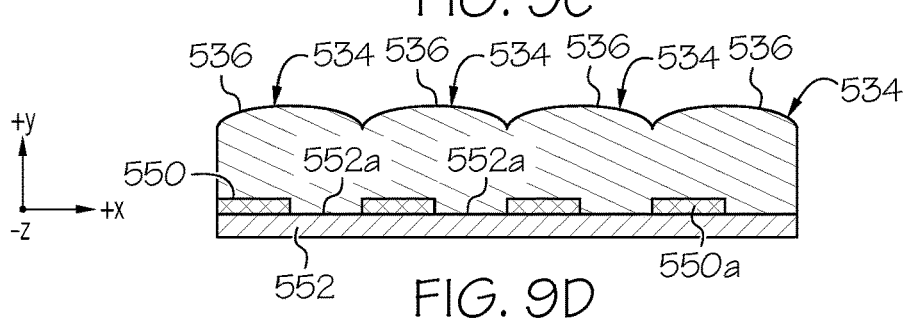
FIG. 9D schematically depicts a non-black color layer attached to the bottom surface of the layer of lenticular lens array material depicted in FIG. 9C.

In other embodiments, FIGS. 9A-9D depict manufacture of an anti-glare panel 52. Referring specifically to FIG. 9A, a lenticular lens layer 524 is located on a bottom mold 520 with a plurality of trenches 528 between a plurality of steps 529. The lenticular lens layer 524 has complimentary trenches 539 and steps 538 (FIG. 9B). The trenches 539 and steps 538 can be formed by the trenches 528 and steps 529 in the bottom mold 520. An upper mold 540 has an inner surface 542 with a desired surface profile to produce a plurality of periodic top domes 536 into an outer surface of the lenticular lens layer 524. As indicated by the downward pointing arrows in FIG. 9A, the inner surface 542 of the mold 540 is moved into contact with the lenticular lens layer 524 such that a plurality of periodic top domes 536 can be formed in the lenticular lens layer 524 as depicted in FIG. 9B. Referring specifically to FIG. 9B, the mold 540 is removed from the lenticular lens layer 524, a plurality of periodic top domes 536 is formed on the lenticular lens layer 524 and a plurality of lenticular lenses 534 having a length direction along the −Z axis is produced. It should be appreciated that the plurality of lenticular lenses 534 can have a desired arcuate shaped dome top, period w and thickness d as discussed above with reference to FIGS. 4B, 5, and 7A. Referring specifically to FIG. 9C, a black color dye 550 is used to fill the plurality of trenches 539. The black color dye 550 can be mixed with a polymer. Filling of the plurality of trenches 539 with the black color dye 550 provides a smooth bottom surface 538a and plurality a black color strips 550a extending along the length direction (−Z axis) of the plurality of lenticular lenses 534. Referring specifically to FIG. 9D, a non-black color layer 552 is attached to the smooth bottom surface 538a. Attachment of the non-black color layer 552 on the smooth bottom surface 538a provides a plurality of alternating black color strips 550a and non-black color strips 552a extending along the length of the plurality of lenticular lenses 534.

Figure 10A:
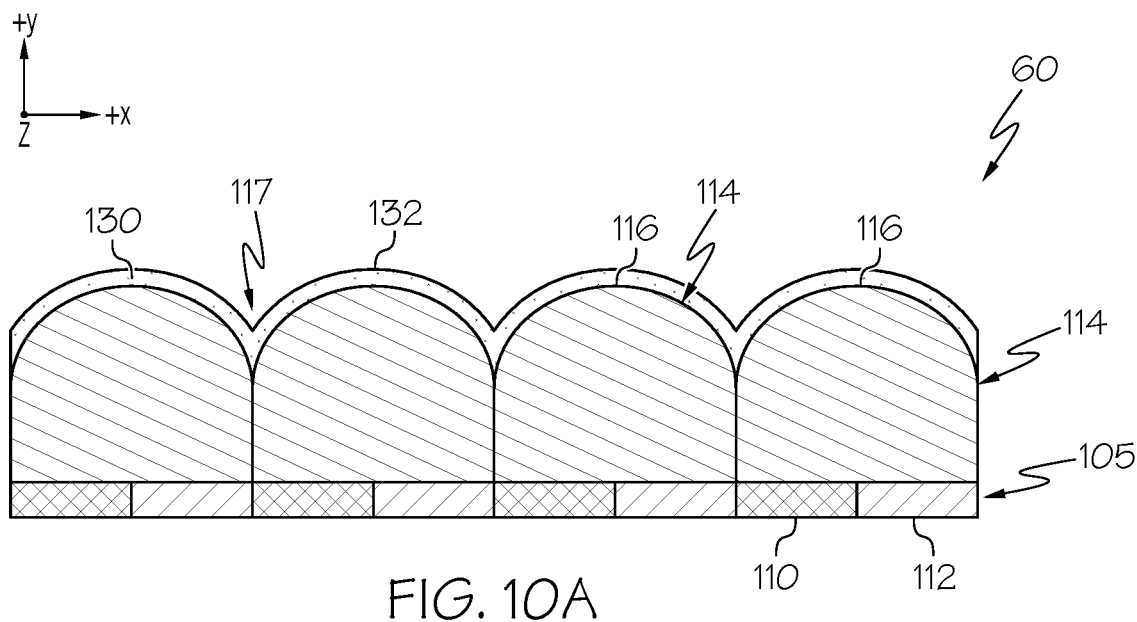
FIG. 10A schematically depicts an anti-glare panel with an anti-reflection layer extending over a plurality of lenticular lenses according to one or more embodiments described and illustrated herein.
Figure 10B:
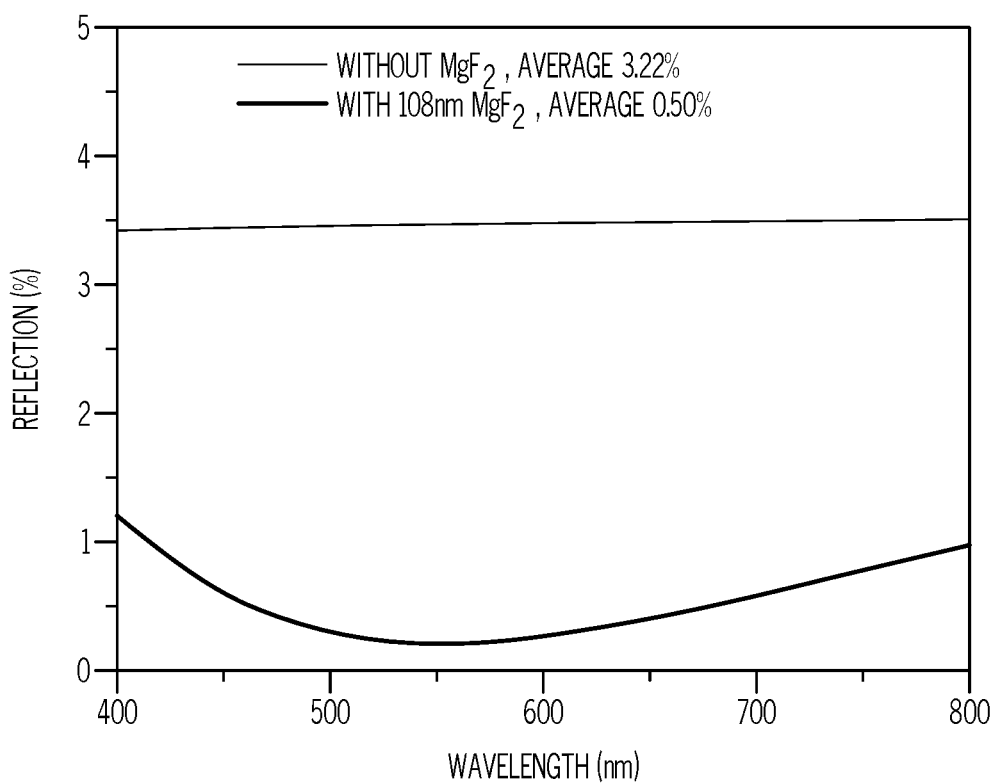
FIG. 10B graphically depicts reflection of an anti-glare panel according to one or more embodiments described and illustrated herein, with and without an anti-reflection layer extending over a plurality of lenticular lenses of the anti-glare panel, as a function of incident light wavelength.

Referring now to FIGS. 10A-10B, another embodiment of an anti-glare panel 60 is depicted. The anti-glare panel 60 includes the plurality of alternating black color strips 110 and non-black color strips 112 along the color layer 105. Extending across the width and the length of plurality of alternating black color strips 110 and non-black color strips 112 is the plurality of lenticular lenses 114 with the dome tops 116. Each pair of a black color strip 110 and a non-black color strip 112 has a single lenticular lens extending across the width and the length of the black color strip 110 and the non-black color strip 112. It should be appreciated that each lenticular lens 114 can be offset from the pair of the black color strip 110 and the non-black color strip 112 as discussed above (FIG. 5). A valley 117 is present between adjacent dome tops 116 of adjacent lenticular lenses 114. Extending across an outer surface 119 of the plurality of lenticular lenses 114 is an anti-reflection layer 130 with an outer surface 132. The anti-reflection layer 130 has an index of refraction $n_\alpha$ that is different the index of refraction n of the plurality of lenticular lenses 114. In embodiments, the index of refraction $n_\alpha$ for the anti-reflection layer 130 is between the index of refraction for the lenticular lens 114 and the index of refraction for air ($n_{air}$=1). For example, the plurality of lenticular lenses 114 can be made from PET with an index of refraction of about 1.7 and the anti-reflection layer 130 can be made from MgF2 with an index of refraction of about 1.38. The anti-reflection layer 130 has a thickness t with a quarter wave thickness of 108 nm. Referring to FIG. 10B, results for reflection by the anti-glare panel 60 as a function of incident light wavelength, with and without the anti-reflection layer 130, are depicted. 10B. As illustrated in FIG. 10B, a reflectance of about 3.2% by the anti-glare panel without an anti-reflection MgF2 layer 130 was reduced to 0.5% with an anti-reflection MgF2 layer 130 present and extending over the outer surface 119 of the plurality of lenticular lenses 114.

Figure 11A:
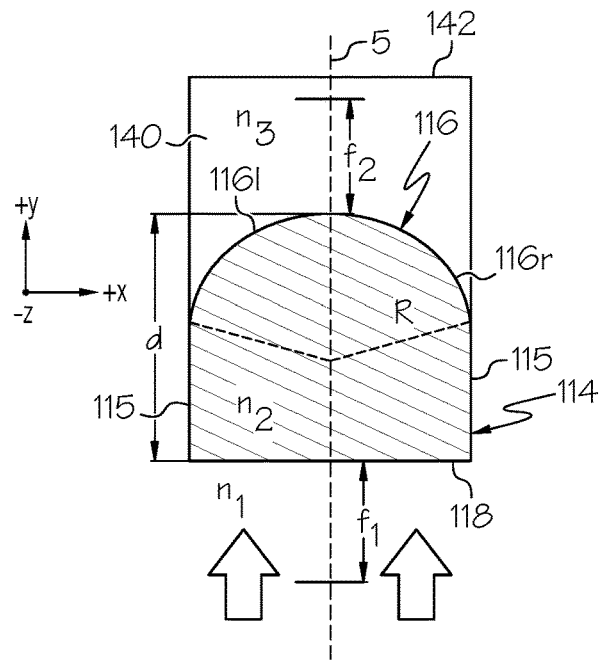
FIG. 11A schematically depicts a dimensional analysis of a single lenticular lens made from a high refractive index material layer covered with a low refractive index material layer.
Figure 11B:
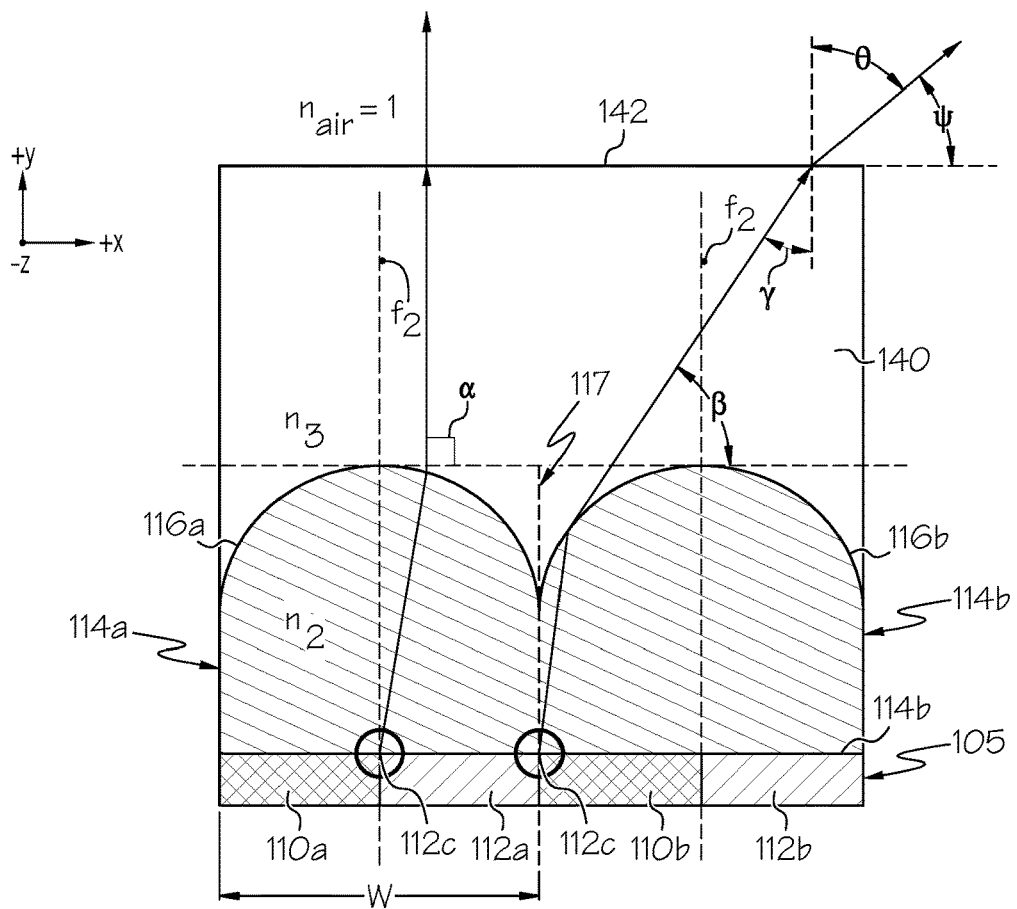
FIG. 11B schematically depicts an analysis of non-veiling glare conditions for lenticular lenses made from a high refractive index material layer covered with a low refractive index material layer using two extreme angular positions on a panel.

Referring now to FIGS. 11A-11B, another embodiment of anti-glare panel 100 based on a combination of high and low refractive index materials is depicted. The embodiment shown in FIGS. 11A-11B has a lenticular lens 114 made from a high refractive index material ($n_2$) covered by a layer 140 made from a low refractive index material ($n_3$) and having a smooth exterior surface 142. The thickness d of the lenticular lens 114 covered with the low refractive index material layer 140 can be calculated by assuming propagation paths of light passing through the lenticular lenses 114 are described by the relation:

$$\vec{M} = \begin{pmatrix} 1 & 0 \\ -\frac{n_3-n_2}{n_3 R} & \frac{n_2}{n_3} \end{pmatrix} \begin{pmatrix} 1 & d \\ 0 & 1 \end{pmatrix} \begin{pmatrix} 1 & 0 \\ 0 & \frac{n_1}{n_2} \end{pmatrix} \quad (8)$$

$$= \begin{pmatrix} 1 & \frac{dn_1}{n_2} \\ -\frac{n_3-n_2}{n_3 R} & \frac{n_1}{n_3} - \frac{dn_1}{n_2}\frac{n_3-n_2}{n_3 R} \end{pmatrix}$$

where $n_2$ is the refractive index of the lenticular lens material, R is the radius of the dome top 116 and is negative when light is coming from the bottom side 118. Also, $f_1$ and $f_2$, which refer to the distances of the first and second focal points, respectively, are described by the relation:

$$f_1 = \frac{n_1 R}{n_3 - n_2} - \frac{dn_1}{n_2}, \quad f_2 = \frac{n_3 R}{n_3 - n_2} \quad (9)$$

Assuming that the first focal plane is at the bottom plane 118, the thickness d is calculated as $d = n_2 R/(n_3 - n_2)$, which is independent of the refractive index of the bottom medium. If the period of the lens is w=50 μm, the colored layer 105 has half black color strips 110 and half non-black color strips 112, then the minimal refracted angle α by lenticular lens 114a for light coming from the left-most position 112b on a non-black color strip 112a and the maximal refracted angle β by adjacent lenticular lens 114b for light coming from the right-most position 112c of the non-black strip 112a are obtained at α=90° and:

$$\beta = \arctan[f_2(w/2)] \quad (10)$$

$$= \arctan\left[\frac{2n_3 R}{(n_3-n_2)w}\right] \geq \arctan\left[\frac{n_3}{(n_2-n_3)}\right]$$

where β has the minimal value only when |R|=w/2=25 μm. Thus the maximal value of the incident angle α t the top media ($n_3$) and the air interface of the light refracted by the adjacent lens is $\gamma_{max}=90°-\beta_{min}=90°-\arctan[n_3/(n_2-n_3)]$. Correspondingly, the refracted angle of this light into the air is:

$$\theta_{max} = \arcsin\left(\frac{n_3 \sin\gamma_{max}}{n_{air}}\right) \quad (11)$$
$$= \arcsin(n_3 \cos(\arctan[n_3/(n_2-n_3)]))$$

To avoid the refracted light from reflecting into the veiling glare range (e.g. assume a rake angle of 35°), then $\psi=90°-\theta_{max}\leq 55°$, that is:

$$n_3 \cos(\arctan [n_3/(n_2-n_3)])\geq \sin 35° \quad (12)$$

Figure 12:
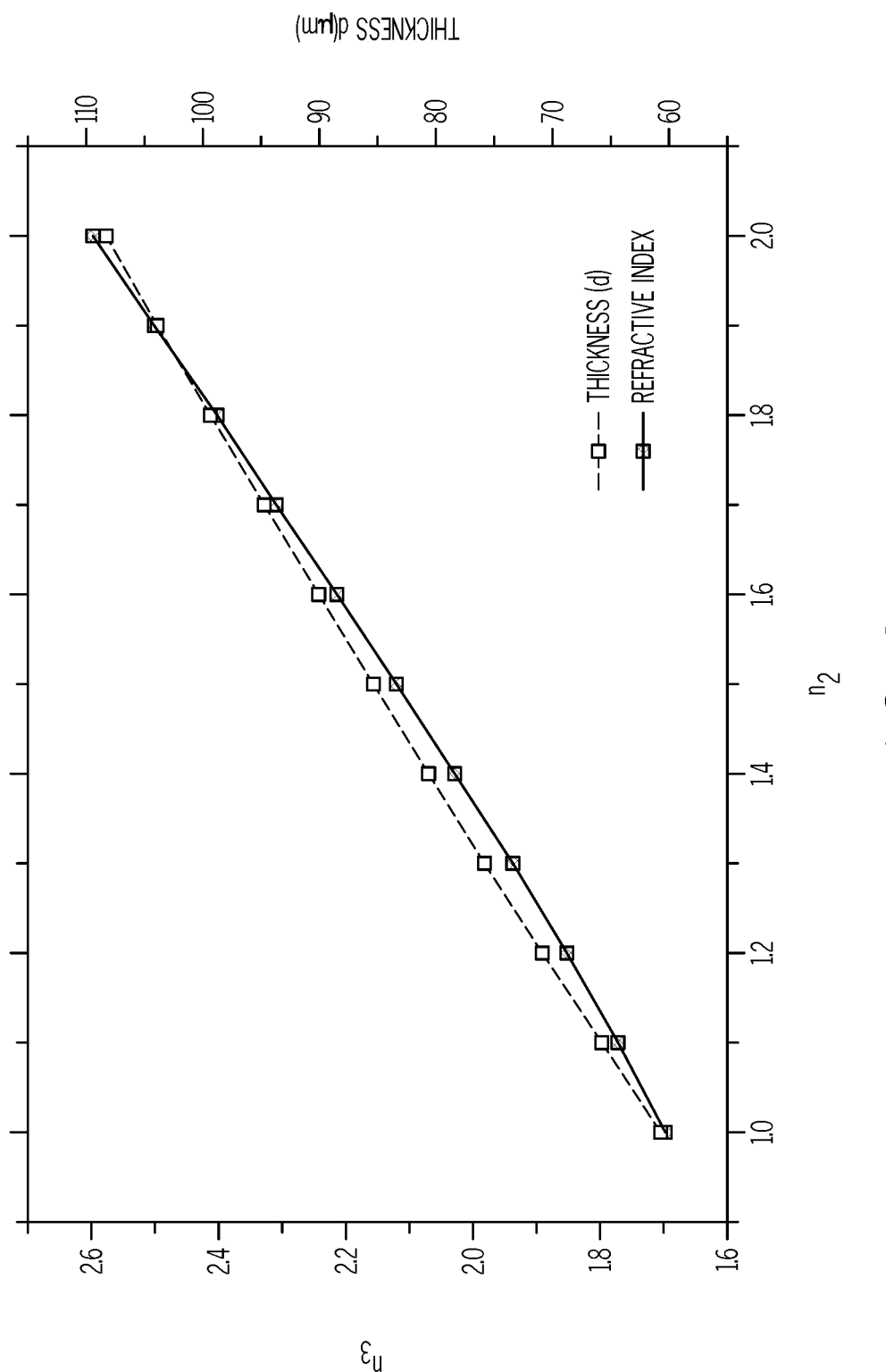
FIG. 12 graphically depicts thickness of a lenticular lens as a function of the refractive index for the high refractive index material layer ($n_2$) covered with the low refractive index material layer ($n_3$) shown in FIGS. 11A-11B.

For the limit case, i.e. $n_3 \cos(\arctan [n_3/(n_2-n_3)])=\sin 35°$, the dependency of the refractive index of the low refractive index material layer 140 ($n_3$) and the thickness of the lens d on the refractive index on the lenticular lens material ($n_2$) is shown in FIG. 12. Accordingly, FIG. 12 illustrates a range of thicknesses d for a lenticular lens 114 as a function of the refractive index $n_2$ for the lenticular lens 114 material and the refractive index $n_3$ for the low refractive index material layer 140.

The lenticular lenses 114 can be made from any transparent material suitable for the manufacture of lenticular lenses including, but not limited to PMMA, polycarbonate, polystyrene, PDMS, cyclic olefin copolymer and the like. In embodiments, the lenticular lenses are made from a material with a refractive index between 1.0 and 2.5. The color layer 105 with the plurality of alternating black color strips 110 and non-black color strips 112 can be made from any material suitable for providing a desired black color and non-black color including, but not limited to, colored pigment, dyes, metal nanoparticles, quantum dots, layered structures that can produce colored reflection or strong absorption, etc.

It should now be understood that embodiments of the present disclosure are directed to anti-glare panels having lenticular lenses made form a plurality of lenticular lenses extending over a plurality of alternating black color and non-black color strips. A single lenticular lens extends over a pair of black color and non-black strips and the pair of black color and non-black color strips extend along a length direction of the lenticular lens. The lenticular lens has a thickness and a dome top with a radius that control the reflection of light off of the non-black color strip outside a veiling glare range. The plurality of lenticular lenses can have a period of equal to or less than 50 μm and thus valleys between adjacent lenticular lenses are not visible to the human eye, the surface of the anti-glare panel appears smooth.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An anti-glare panel comprising:
   a panel with a length and a width;
   a plurality of alternating black strips and non-black strips extending along the length of the panel and periodic along the width of the panel;
   a plurality of lenticular lenses periodic along the width of the panel and extending along the length of the panel and over the plurality of alternating black strips and non-black strips;
   wherein light reflected from the plurality of alternating black strips is refracted by the plurality of lenticular lenses within a veiling glare range γ and light reflected from the non-black strips is refracted by the plurality of lenticular lenses outside the veiling glare range γ.

2. The anti-glare panel of claim 1, wherein the veiling glare range γ is less than 35 degrees or more than 85 degrees relative to a surface of the panel.

3. The anti-glare panel of claim 1, wherein each of the plurality of lenticular lenses generally covers a pair of a black strip and a non-black strip.

4. The anti-glare panel of claim 3, wherein each of the plurality of lenticular lenses is offset from the pair of the black strip and the non-black strip.

5. The anti-glare panel of claim 1, further comprising a glass pane adjacent the panel, the glass pane oriented with respect to the panel at a rake angle θ with the rake angle θ between 25 to 35 degrees, inclusive.

6. The anti-glare panel of claim 5, wherein the panel is a vehicle dashboard and the glass pane is a vehicle windshield.

7. The anti-glare panel of claim 1, wherein each of the plurality of lenticular lenses has a thickness d of less than 100 μm.

8. The anti-glare panel of claim 1, wherein each lenticular lens has an arcuate dome top.

9. The anti-glare panel of claim 8, wherein the arcuate dome top is a hemispherical dome top with a radius R of less than 50 μm.

10. The anti-glare panel of claim 1, wherein the plurality of lenticular lenses have an index of refraction n between 1.2 and 2.0.

11. The anti-glare panel of claim 10, further comprising an anti-reflection layer extending over the plurality of lenticular lenses, the anti-reflection layer having an index of refraction $n_\alpha$ that is greater than 1.0 and less than n.

12. The anti-glare panel of claim 11, wherein the anti-reflection layer is an $MgF_2$ layer.

13. The anti-glare panel of claim 1, further comprising a low refractive index material layer extending over the plurality of lenticular lenses, the low refractive index material layer having a refractive index that is lower that the refractive index of the plurality of lenticular lenses.

14. An anti-glare dashboard comprising:
   a glass pane for viewing through;
   a dashboard with a length and a width, the dashboard adjacent to the glass pane and oriented at a rake angle θ relative to the glass pane;
   a plurality of alternating black strips and non-black strips extending along the length of the dashboard and periodic along the width of the dashboard;
   a plurality of lenticular lenses periodic along the width of the dashboard and extending along the length of the dashboard over the plurality of alternating black strips and non-black strips;
   wherein light reflected from the plurality of alternating black strips is refracted by the plurality of lenticular lenses within a veiling glare range γ between 2θ-30° and 2θ+30° and light reflected from the non-black strips is refracted by the plurality of lenticular lenses outside the veiling glare range $\gamma$ between $2\theta$-$30°$ and $2\theta$+$30$ °.

15. The anti-glare dashboard of claim 14, wherein each of the plurality of lenticular lenses extends over a pair of a black strip and a non-black strip.

16. The anti-glare dashboard of claim 15, wherein each of the plurality of lenticular lenses is offset from the pair of the black strip and the non-black strip.

17. The anti-glare dashboard of claim 14, wherein each lenticular lens array has an arcuate dome top and a thickness d less than 100 µm.

18. The anti-glare dashboard of claim 17, wherein the arcuate dome top is a hemispherical dome top with a radius R less than 50 µm.

19. The anti-glare dashboard of claim 14, wherein the plurality of lenticular lenses have an index of refraction n.

20. The anti-glare dashboard of claim 19, further comprising an anti-reflection top coat extending over the plurality of lenticular lenses, the anti-reflection top coat having an index of refraction $n_a$ that is greater than an index of refraction of air and less than n.

\* \* \* \* \*

UNITED STATES PATENT AND TRADEMARK OFFICE
CERTIFICATE OF CORRECTION

PATENT NO. : 10,527,759 B2
APPLICATION NO. : 15/131837
DATED : January 7, 2020
INVENTOR(S) : Lingjie Jay Guo, Debasish Banerjee and Chengang Ji It is certified that error appears in the above-identified patent and that said Letters Patent is hereby corrected as shown below:

On the Title Page

In Column 2, item (56), other publications, cite no: 1, delete "Schumann et. al. ("Daytime veiling glare and driver visual performance" Influence of Windshield rake angle and Dashboard reflectance, Journal of Safety Research, vol. 28, No. 3, pp. 133-146, 1997)." and insert --Schumann et. al. ("Daytime veiling glare and driver visual performance: Influence of Windshield rake angle and Dashboard reflectance", Journal of Safety Research, vol. 28, No. 3, pp. 133-146, 1997).--, therefor.

In the Specification

In Column 7, Line(s) 7, delete "$\alpha_1$" and insert --$a_1$--, therefor.

In Column 7, Line(s) 9, delete "$\alpha_2$" and insert --$a_2$--, therefor.

In Column 7, Line(s) 11, delete "$\alpha_2$" and insert --$a_2$--, therefor.

In Column 7, Line(s) 12, delete "$\alpha_1(\alpha_2>\alpha_1)$" and insert --$a_1(a_2>a_1)$--, therefor.

In Column 7, Line(s) 45, delete "$\alpha_2>\alpha_1$" and insert --$a_2>a_1$--, therefor.

In Column 7, Line(s) 50, delete "$(\alpha_2-\alpha_1)$" and insert --$(a_2-a_1)$--, therefor.

In Column 7, Line(s) 57, delete "$\alpha_1$ and $\alpha_2$" and insert --*$a_1$ and $a_2$*--, therefor.

In Column 7, Line(s) 60, delete "$\alpha_1=0$" and insert --*$a_1=0$*--, therefor.

In Column 7, Line(s) 61, delete "$\alpha_2=w/2=25\mu m$" and insert --*$a_2=w/2=25\mu m$*--, therefor.

In Column 8, Line(s) 5, delete "$\alpha_1=0$ and $\alpha_2=25\mu m$" and insert --*$a_1=0$ and $a_2=25\mu m$*--, therefor.

Signed and Sealed this
Seventeenth Day of March, 2020

Andrei Iancu
*Director of the United States Patent and Trademark Office*

CERTIFICATE OF CORRECTION (continued)
U.S. Pat. No. 10,527,759 B2

In Column 8, Line(s) 25, delete "$\alpha_1, \alpha_2$" and insert --$a_1, a_2,$--, therefor.

In Column 9, Line(s) 66, delete "$\mathbf{n}_\alpha$" and insert --$n_a$--, therefor.

In Column 10, Line(s) 1, delete "$\mathbf{n}_\alpha$" and insert --$n_a$--, therefor.

In the Claims

In Column 12, Line(s) 44, delete "$\mathbf{n}_\alpha$" and insert --$n_a$--, therefor.